United States Patent
Khayrallah

(10) Patent No.: US 12,137,011 B2
(45) Date of Patent: Nov. 5, 2024

(54) SIGNAL MAGNITUDE SHAPING

(71) Applicant: Telefonaktiebolaget LM Ericsson (publ), Stockholm (SE)

(72) Inventor: Ali S. Khayrallah, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 17/921,306

(22) PCT Filed: May 4, 2020

(86) PCT No.: PCT/IB2020/054211
§ 371 (c)(1),
(2) Date: Oct. 25, 2022

(87) PCT Pub. No.: WO2021/224654
PCT Pub. Date: Nov. 11, 2021

(65) Prior Publication Data
US 2023/0171133 A1    Jun. 1, 2023

(51) Int. Cl.
*H04L 1/02* (2006.01)
*H04B 1/04* (2006.01)
*H04L 25/03* (2006.01)
*H04L 27/36* (2006.01)

(52) U.S. Cl.
CPC ......... *H04L 25/03828* (2013.01); *H04B 1/04* (2013.01); *H04L 27/364* (2013.01)

(58) Field of Classification Search
CPC ............... H04B 1/0475; H04B 15/02; H04B 2215/067; H03F 1/3247; H03F 2200/411; H03F 1/02; H03F 1/32; H04L 25/03828; H04L 27/01; H04L 27/3405; G01S 19/23
USPC ................ 375/267, 260, 262, 346
See application file for complete search history.

(56) References Cited

U.S. PATENT DOCUMENTS

2006/0227895 A1* 10/2006 Booth ............... H04L 25/03866
 375/296
2007/0189363 A1*  8/2007 Eriksson ............ H04B 1/71052
 375/150
2008/0095284 A1   4/2008 Hori et al.

FOREIGN PATENT DOCUMENTS

WO      2003036894 A2    5/2003

OTHER PUBLICATIONS

International Search Report and Written Opinion of the International Searching Authority for PCT International Application No. PCT/IB2020/054211 dated Mar. 26, 2021.
Invitation to Pay Additional Fees for PCT International Application No. PCT/IB2020/054211 dated Feb. 1, 2021.

\* cited by examiner

*Primary Examiner* — Khai Tran
(74) *Attorney, Agent, or Firm* — Sage Patent Group

(57) ABSTRACT

A network node operating in a communication network can determine a magnitude of a time sample of a modulated signal. The network node can determine a correction signal based on a difference between the magnitude of the time sample and a predetermined value. The network node can modify the modulated signal by the correction signal.

17 Claims, 8 Drawing Sheets

SIGNAL MAGNITUDE SHAPING

CROSS REFERENCE TO RELATED APPLICATION

This application is a 35 U.S.C. § 371 national stage application of PCT International Application No. PCT/IB2020/054211 filed on May 4, 2020, the disclosure and content of which is incorporated by reference herein in its entirety.

TECHNICAL FIELD

The present disclosure relates generally to communicating between network nodes in a wireless communication system.

BACKGROUND

Constraining the magnitude of a transmitted signal enables the use of a power amplifier ("PA") with looser linearity constraints, and also allows operation of the PA closer to its saturation point. True constant envelope signals have been used in early technologies such as GSM and Bluetooth, but they give up performance and spectrum compactness. The trend since EDGE and WCDMA has been towards linear modulation schemes which can support higher order constellations (PSK, QAM etc.). The trend has continued with the adoption of orthogonal frequency domain modulation ("OFDM") and carrier aggregation. This in turn has required the use of very linear PA's with a large backoff to accommodate signal magnitude variations. As higher frequencies (in 10's and 100's of GHz) and wider bandwidth are used, the signal quality suffers from a combination of decreased PA output power and increased path loss.

SUMMARY

According to some embodiments, a method of operating a network node of a communication network is provided. The method includes determining a magnitude of a time sample of a modulated signal. The method further includes determining a correction signal based on a difference between the magnitude of the time sample and a predetermined value. The method further includes modifying the modulated signal by the correction signal.

According to other embodiments, a network node operating in a communication network is provided. The network node including processing circuitry and memory coupled to the processing circuitry. The memory has instructions stored therein that are executable by the processing circuitry to cause the network node to perform operations. The operations include determining a magnitude of a time sample of a modulated signal. The operations further include determining a correction signal based on a difference between the magnitude of the time sample and a predetermined value. The operations further include modifying the modulated signal by the correction signal.

In other embodiments, a network node operating in a communication network and adapted to perform operations is provided. The operations include determining a magnitude of a time sample of a modulated signal. The operations further include determining a correction signal based on a difference between the magnitude of the time sample and a predetermined value. The operations further include modifying the modulated signal by the correction signal.

In other embodiments, a computer program is provided. The computer program includes program code to be executed by processing circuitry of a network node operating in a communication network, whereby execution of the program code causes the network node to perform operations. The operations include determining a magnitude of a time sample of a modulated signal. The operations further include determining a correction signal based on a difference between the magnitude of the time sample and a predetermined value. The operations further include modifying the modulated signal by the correction signal.

In other embodiments, a computer program product is provided. The computer program product includes a non-transitory storage medium including program code to be executed by processing circuitry of a network node operating in a communication network, whereby execution of the program code causes the network node to perform operations. The operations include determining a magnitude of a time sample of a modulated signal. The operations further include determining a correction signal based on a difference between the magnitude of the time sample and a predetermined value. The operations further include modifying the modulated signal by the correction signal.

In various embodiments described herein, a shaping scheme is used to constrain the signal magnitude variation at the transmitter. A modulation signal can be shaped by adding a correction signal. A global parameter allows a tradeoff of signal correction and distortion. The receiver for the original signal can be used with the modified signal with minimal performance loss.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Unless explicitly stated otherwise, components from one embodiment may be assumed to be present/used in another embodiment.

Some linear modulation schemes have weak control over signal magnitude. Some constant envelope schemes give up too much performance. Some embodiments described herein may maintain the advantages of linear modulation while keeping signal magnitude variation under control.

Various embodiments described herein provide a shaping scheme which constrains the signal magnitude variation. A linear modulation signal can be shaped by adding a correction signal. In some embodiments, the corrections are small and smooth, so that the new signal is still similar to the original (linear modulation signal) in terms of power and spectrum. In additional or alternative embodiments, the corrections are local in the sense that the correction is a function of a small neighboring time interval of the original, which simplifies the transmitter. In additional or alternative embodiments, the receiver can be unchanged with minimal impact on performance.

In some embodiments, a linear modulation scheme can be shaped by limiting the magnitude in the time domain. For example, signals without deep nulls in the time domain (e.g., shifted PSK), can be effectively shaped by limiting the magnitude in the time domain. In additional or alternative embodiments, a correction signal in a direction orthogonal to the original signal can be used. A correction signal in a direction orthogonal to the original signal can be effective for shaping modulation schemes with deep dips (e.g., PSK or QAM), where the original signal goes to zero, or very close to zero.

In some embodiments, the linear modulation schemes can be adapted via shaping to new scenarios with more emphasis on PA efficiency. The degree of shaping can be controlled by a parameter, enabling a tradeoff between magnitude variation and signal distortion to suit the situation and/or type of signal being transmitted.

Figure 9:
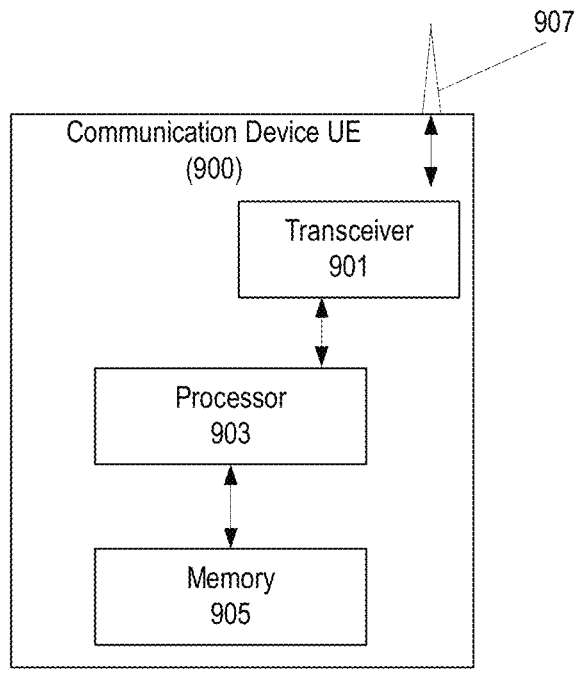
FIG. 9 is a block diagram illustrating an example of a terminal device in accordance with some embodiments.

FIG. 9 is a block diagram illustrating elements of a communication device UE 900 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device UE 900 may include an antenna 907, and transceiver circuitry 901 (also referred to as a transceiver) including a transmitter and a receiver configured to provide uplink and downlink radio communications with a base station(s) (also referred to as a RAN node) of a radio access network. Communication device UE 900 may also include processing circuitry 903 (also referred to as a processor) coupled to the transceiver circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that separate memory circuitry is not required. Communication device UE 900 may also include an interface (such as a user interface) coupled with processing circuitry 903, and/or communication device UE may be incorporated in a vehicle.

As discussed herein, operations of communication device UE 900 may be performed by processing circuitry 903 and/or transceiver circuitry 901. For example, processing circuitry 903 may control transceiver circuitry 901 to transmit communications through transceiver circuitry 901 over a radio interface to a radio access network node (also referred to as a base station) and/or to receive communications through transceiver circuitry 901 from a RAN node over a radio interface. Moreover, modules may be stored in memory circuitry 905, and these modules may provide instructions so that when instructions of a module are executed by processing circuitry 903, processing circuitry 903 performs respective operations.

Figure 10:
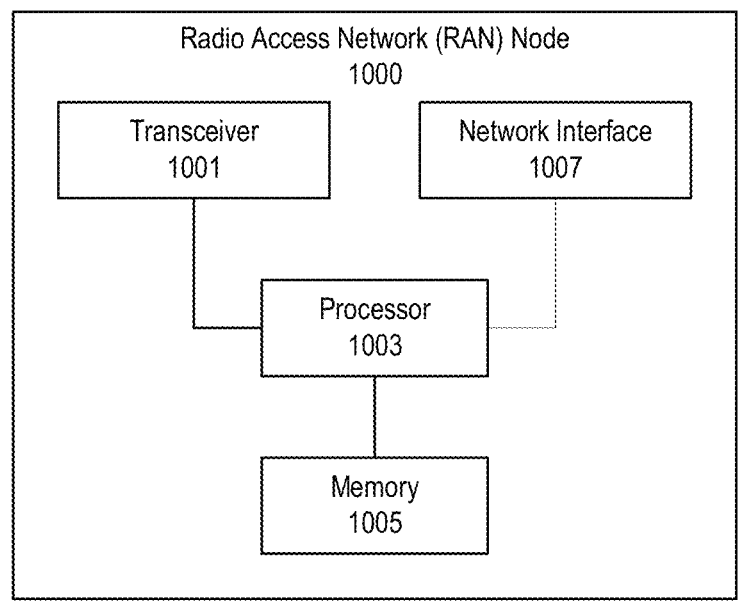
FIG. 10 is a block diagram illustrating an example of a radio access network ("RAN") node in accordance with some embodiments.

FIG. 10 is a block diagram illustrating elements of a radio access network RAN node 1000 (also referred to as a network node, base station, eNodeB/eNB, gNodeB/gNB, etc.) of a Radio Access Network (RAN) configured to provide cellular communication according to embodiments of inventive concepts. As shown, the RAN node 1000 may include transceiver circuitry 1001 including a transmitter and a receiver configured to provide uplink and downlink radio communications with mobile terminals. The RAN node 1000 may include network interface circuitry 1007 configured to provide communications with other nodes (e.g., with other base stations) of the RAN and/or core network CN. The RAN node 1000 may also include processing circuitry 1003 (also referred to as a processor, e.g., corresponding to processing circuitry 4170) coupled to the transceiver circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the RAN node 1000 may be performed by processing circuitry 1003, network interface 1007, and/or transceiver 1001. For example, processing circuitry 1003 may control transceiver 1001 to transmit downlink communications through transceiver 1001 over a radio interface to one or more mobile terminals UEs and/or to receive uplink communications through transceiver 1001 from one or more mobile terminals UEs over a radio interface. Similarly, processing circuitry 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to network nodes).

According to some other embodiments, a network node may be implemented as a core network CN node without a wireless transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 11:
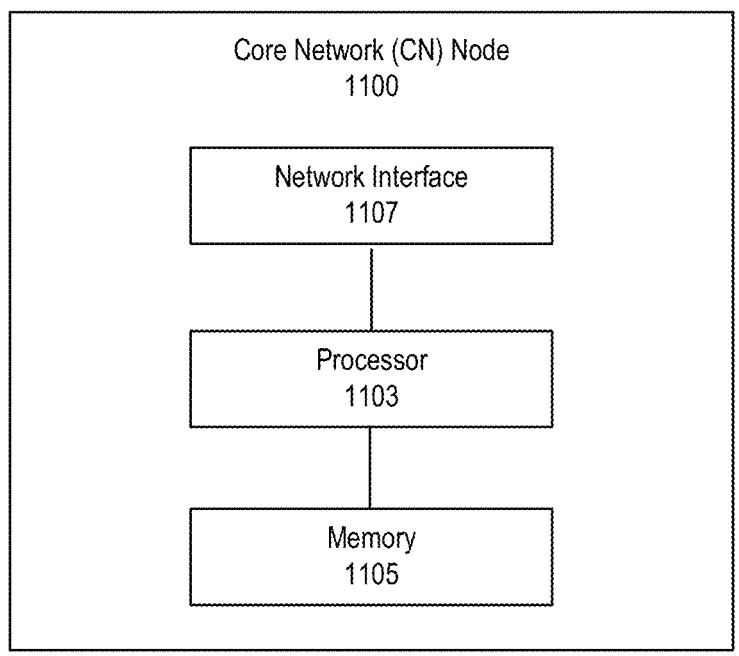
FIG. 11 is a block diagram illustrating an example of a core network ("CN") node in accordance with some embodiments.

FIG. 11 is a block diagram illustrating elements of a core network CN node 1100 (e.g., an SMF node, an AMF node, etc.) of a communication network configured to provide cellular communication according to embodiments of inventive concepts. As shown, the CN node 1100 may include network interface circuitry 1107 (also referred to as a network interface) configured to provide communications with other nodes of the core network and/or the RAN. The CN node 1100 may also include a processing circuitry 1103 (also referred to as a processor) coupled to the network interface circuitry, and memory circuitry 1105 (also referred to as memory) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the CN node 1100 may be performed by processing circuitry 1103 and/or network interface circuitry 1107. For example, processing circuitry 1103 may control network interface circuitry 1107 to transmit communications through network interface circuitry 1107 to one or more other network nodes and/or to receive communications through network interface circuitry from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to network nodes).

Consider a linear modulation signal of the form $$s(t) = \sum_n S(n)p(t-nT)$$

where S(n) is chosen from complex modulation constellation Q. In some examples, the pulse shape p(t) can be assumed to cause no intersymbol interference ("ISI") at the matched filter receiver. A p(t) can be compact, in the sense that most of the contribution to the values of s(t) between nT and (n+1)T come from the neighboring symbols S(n) and S(n+1).

The linear modulation format is not a necessary assumption. But, most practical schemes are linear, and even practical non-linear schemes such as GMSK for GSM are closely approximated with linear models.

Figure 2:
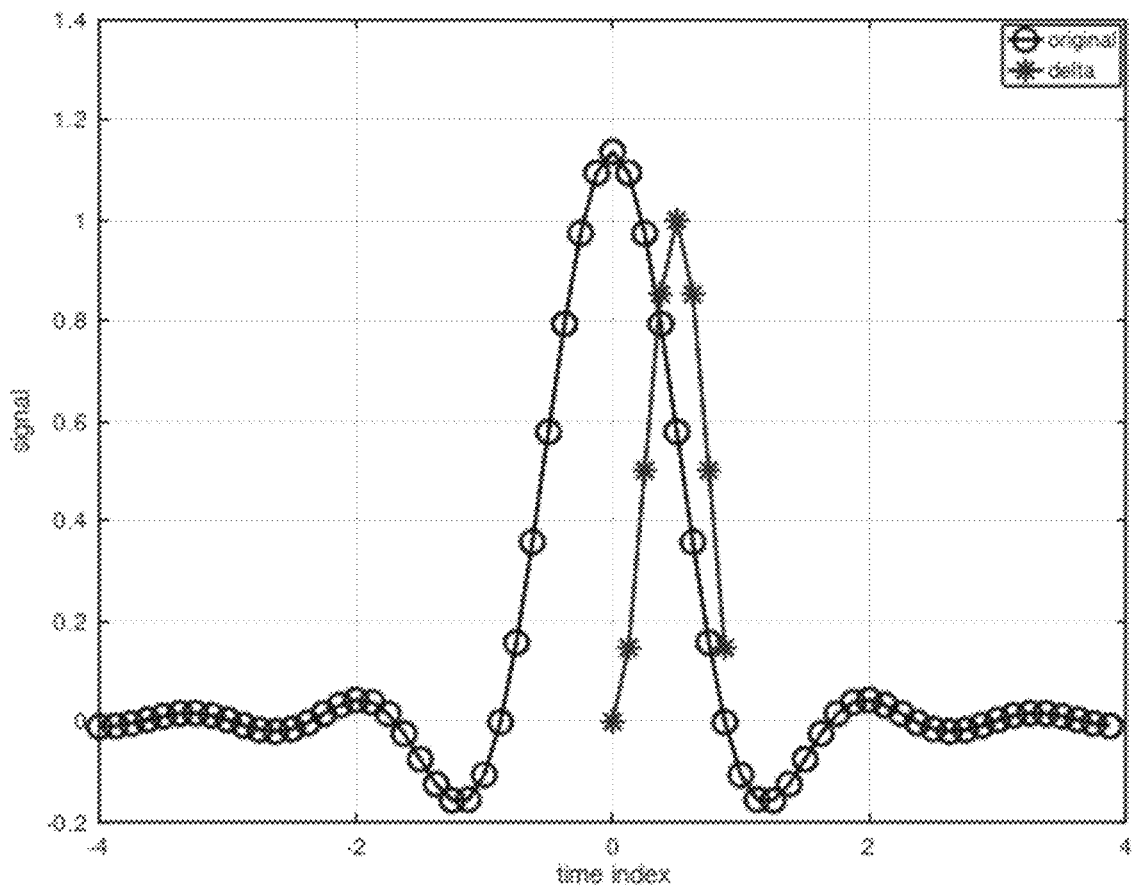
FIG. 2 is graph illustrating an example of a signal versus time index in accordance with some embodiments.

A root raised cosine ("RRC") signal can be used to illustrate some embodiments. A matched filter receiver results in a raised cosine signal, which equals zero for t=nT, n≠0, meaning that there is no ISI at the receiver. The parameter β (0≤β≤1) controls the sharpness of the spectrum of the RRC signal. The pulse shape is shown in FIG. 2 for β=0.5.

In designing a modulation signal that shapes the magnitude in the time domain, it is not enough to consider the constellation Q. The more difficult problem is what happens to s(t) between sampling points. In some modulation schemes, such as baseline BPSK, s(t) can dip all the way to zero.

Some embodiments control the dips in s(t) by generating a correction signal δ(t) such that the new signal, r(t)=s(t)+δ(t), has shallower dips. Similar embodiments can be used to limit signal peaks and will be discussed later.

In some embodiments, the following corrections are small and smooth enough that r(t) is still similar to s(t) in terms of power, spectrum, etc. In additional or alternative embodiments, the corrections are local in the sense that δ(t) is a function of a small neighboring time interval of s(t), which simplifies the transmitter. In additional or alternative embodiments, the original receiver is usable for s(t) with a minimal impact on performance.

Some embodiments may be most effective when correcting modulation schemes that do not have extreme variation in magnitude. For example, the family of shifted PSK modulation, which avoids extreme magnitude dips by shifting the constellation points every period. This includes π/2-BPSK, π/4-QPSK, and π/8-QPSK. By contrast, in some schemes such as (unshifted) BPSK or QPSK, the signal can dip to zero, the correction can become large, and the corrected signal can become dissimilar to the original.

A predetermined or dynamically determined value L can represent a target minimum value for |r(t)|. A pulse shape $p_δ(t)$ can be selected for δ(t) with support region [0, T], all values in [0, 1], $p_δ(0)=0$, p(T)=0, and $p_δ(T/2)=1$.

In some embodiments, it can be assumed that s(t) has already been generated, and without loss of generality, consider the interval (0, T) of s(t). If s(t)<L anywhere over (0, T), then these points can be increased in magnitude.

In some embodiments, the mid-point value s(T/2) is selected as a representative of (0, T). Herein, let φ{ } denote the phase operator. For modulation schemes that avoid extreme dips, |s(T/2)| will not be very small, and φ{s(T/2)} provides a good direction for the correction operation. If |s(T/2)|≥L, then s(t) can be left unchanged over (0, T). If |s(T/2)|<L, then |r(T/2)| can be generated such that |r(T/2)|=L while keeping the phase φ{r(T/2)}={s(T/2)}, and s(t) can be increased over the whole interval (0,T) in the same direction. This can be accomplished by generating the correction signal to be $$δ(t)=(L-|s(T/2)|)e^{jφ\{s(T/2)\}}p_δ(t)$$

over (0,T), then generating the received signal, r(t), as $$r(t)=s(t)+(t)=δ(t)+(L-|s(T/2)|)e^{jφ\{s(T/2)\}}p_δ(t)$$

over (0,T).

This same correction can be repeated over all periods (nT,(n+1)T). Thus, the correction signal can be defined as $$δ(t) = \sum_n \max(L - |s(nT + T/2)|, 0)e^{jφ\{s(nT+T/2)\}}p_δ(t-nT)$$

Figure 1:
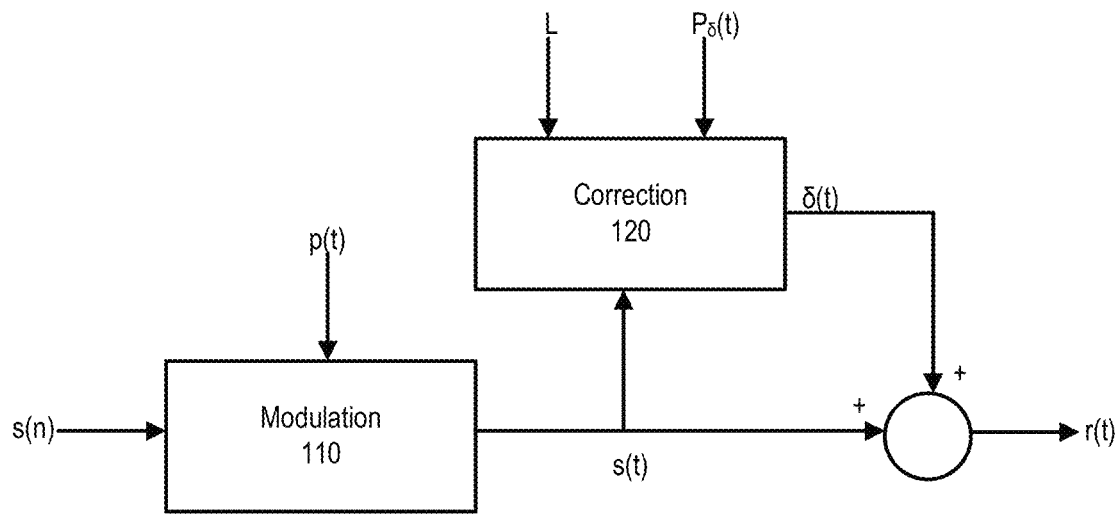
FIG. 1 is a bock diagram illustrating an example of dip correction with a correction signal based on an original signal in accordance with some embodiments.

The block diagram of the modulator with correction is shown in FIG. 1 As shown in FIG. 1, a modulation unit 110 (or a pulse shaping unit) shapes a modulated signal s(n) using a pulse shape p(t) to generate a pulse-shaped signal s(t). A correction unit 120 generates a correction signal δ(t), which is added to the modulated signal s(t) to generate a corrected signal r(t).

In some embodiments, for a practical p(t) with a finite support region, s(t) becomes available for the interval (0, T) after a delay equal to that support region, at which point we can generate δ(t) for the same interval (0, T). For example, the RRC pulse, which has infinite support in theory, can be truncated to a support region of 8 symbol periods, as shown in FIG. 2.

In some embodiments, δ(t) can be thought of as a linear modulation scheme driven by artificial correction symbols from a complex constellation $$S_\delta(n) = \max(L - |s(nT+T/2)|, 0) e^{j\varphi\{s(nT+T/2)\}}$$

and pulse shape $p_\delta(t)$, that is $$\delta(t) = \sum_n S_\delta(n) p_\delta(t - nT)$$

Selecting $p_\delta(t)$ with $p_\delta(0)=0$ and $p_\delta(T)=0$ can result in δ(nT)=0, which means that the values at the sampling points are unchanged, r(nT)=s(nT), which contributes to enabling the use of the original receiver for s(t) in receiving r(t).

In some embodiments, it is desirable to make the correction signal δ(t) smooth in order to reduce/minimize the impact on the spectrum of r(t). To do so, $p_\delta(t)$ can be chosen to be smooth and to have derivative equal to zero at t=0 and t=T. This smoothness will carry over to δ(t). FIG. 2 depicts one suitable choice of the function:

$$p_\delta(t) = \frac{1 + \cos\left(\frac{2\pi(t - T/2)}{T}\right)}{2}$$

The above function with support (0, T) will satisfy the requirements, is smooth, and satisfies the derivative requirement To quantify the effective range of |s(t)|, the 5 and 95 percentile values, which we denote $\alpha_5$ and $\alpha_{95}$, can be used. The lowest interesting value of L is around $\alpha_5$. Below that very little happens. As L increases, at some point δ(t) becomes large, and r(t) becomes dissimilar to s(t).

In some embodiments, the similarity of r(t) to s(t) can be observed in terms of power, spectrum, and residual error at the receiver. P{ } denotes the power operator (e.g., an average of squared magnitudes), which can be applied to symbols or signals. In some examples, similarity can be quantified by a difference between P{r(t)} and P{s(t)}, which can remain low based on P{δ(t)} being small. F{ } denotes the Fourier transform operator, and G{ } denotes the spectrum. Under the usual IID assumptions for S(n), the spectrum of s(t) can be determined by P{S(n)} and F{p(t)} to be $G\{s(t)\} = P\{S(n)\}|F\{p(t)\}|^2$. Similarly, the spectrum of δ(t) is determined by $P\{S_\delta(n)\}$ and $F\{p_\delta(t)\}$ to be $G\{\delta(t)\} = P\{S_\delta(n)\}|F\{p_\delta(t)\}|^2$. Even though s(t) and δ(t) are not independent, we can approximate the spectrum of r(t) by $$G\{r(t)\} = G\{s(t)\} + G\{\delta(t)\} = P\{S(n)\}|F\{p(t)\}|^2 + P\{S_\delta(n)\}|F\{p_\delta(t)\}|^2$$

As long as the correction signal power $P\{S\_\delta(n)\}$ is small then the spectrum G{r(t)} will be close to G{s(t)}.

In some embodiments, the matched filter receiver for s(t), based on the selected p(t), results in no ISI at the optimal sampling point. If the same receiver is applied to r(t), the presence of δ(t) will result is a residual error Δ(n) at the sampling point, which can be treated as an additional noise source. Its power P{Δ(n)} represents the impact of to δ(t) at the receiver. P{Δ(n)} can be thought of as an additional term in the denominator of the SNR at the receiver.

Figure 3:
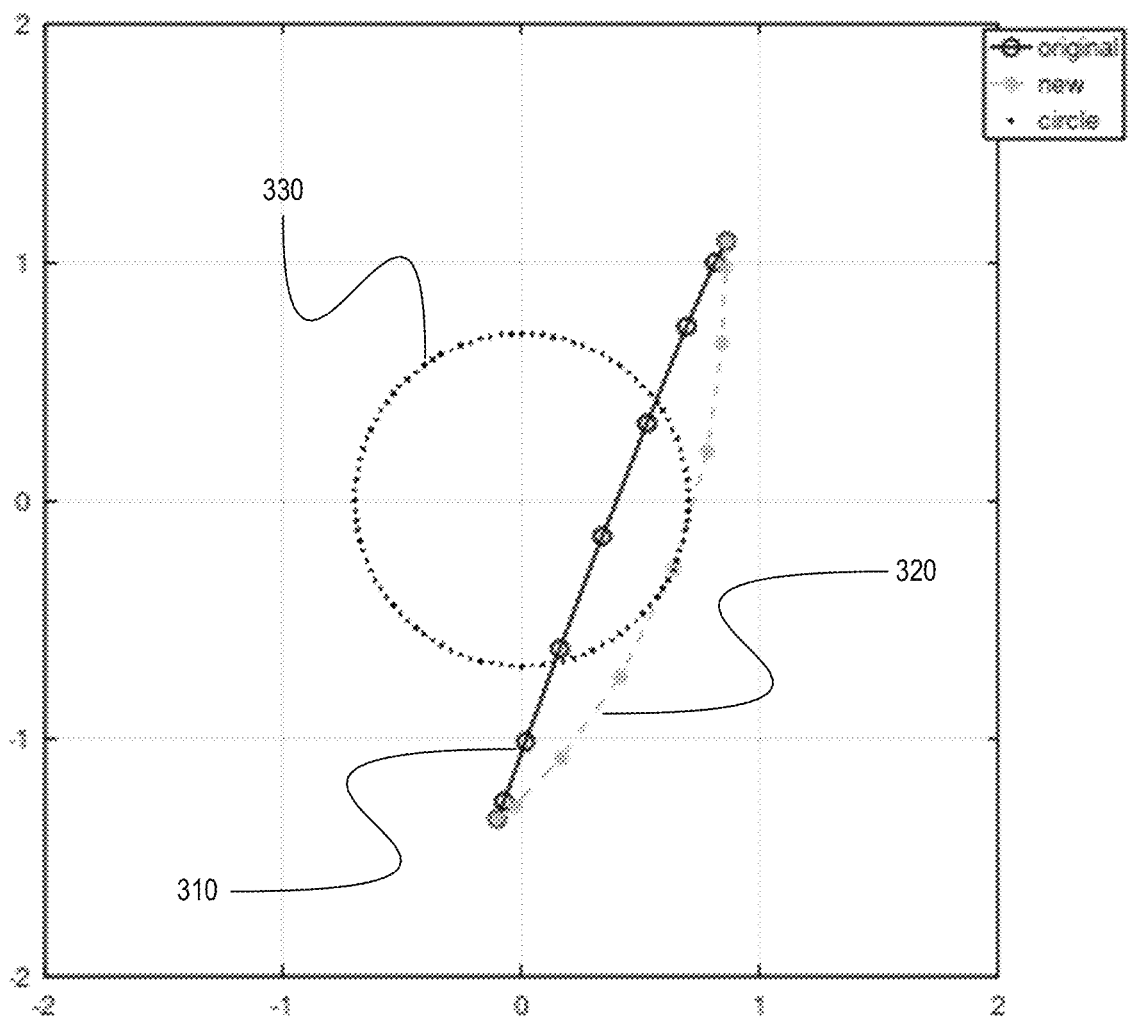
FIG. 3 is a graph illustrating an example of π/4-QPSK trajectory in complex domain over one period in accordance with some embodiments.

FIGS. 3 and 4A-C illustrate an example with π/4-QPSK. In FIG. 3, s(t) 310 is illustrated by the solid line. In this example, s(t) 310 is generated at a sampling rate of 8 samples per symbol, and the eight samples in the interval are represented by open circles. Here, $\alpha_5$ can equal 0.48 meaning that 5% of s(t) is less that 0.48, and $\alpha_{95}$ equal to 1.25 meaning that 95% of s(t) is less than 1.25. The received signal r(t) 320 is represented by a dashed line with closed circles points indicate specific samples. The dotted circle 330 represents the predetermined value, L, which here is 0.7. The signal s(t) 310 can be scaled so that P{s(t)} is 0 dB. A snapshot of the complex domain trajectories of s(t) 310 and r(t) 320 over a period (nT,(n+1)T) is shown in FIG. 3. It illustrates how δ(t) increases the signal magnitude up toward the target value L.

Figure 4A:
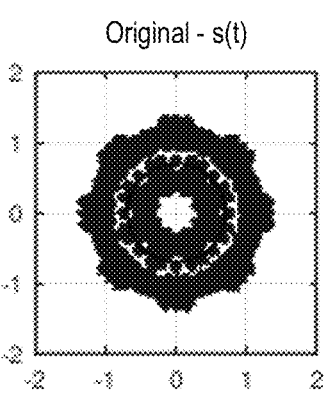
FIGS. 4A-C are graphs illustrating examples of trajectories in complex domain associated with the π/4-QPSK trajectory of FIG. 3 in accordance with some embodiments.
Figure 4B:
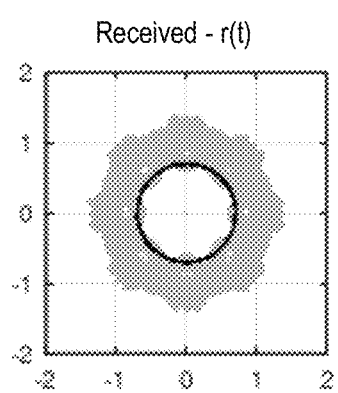
Figure 4C:
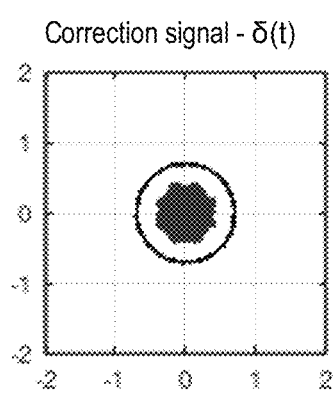

The complete complex trajectories of s(t), r(t), and δ(t) are shown in FIGS. 4A-C respectively. Each of FIGS. 4A-C include a circle with a radius of 0.7 indicating L=0.7. Few samples having a magnitude below 0.7 remain for r(t). Indeed, in this example, $\alpha_5$ for r(t) is 0.70 meaning 5% of r(t) is less than 0.7. On the other end, $\alpha_{95}$ is unchanged, indicating that the higher values are left alone. Using $\alpha_{95}-\alpha_5$ as an indicator of the dynamic range a reduction of 40% over the original signal is obtained.

The spectrum can be computed by averaging the squared magnitude of the FT of 128-point sections. Overall G{r(t)} is very close to G{s(t)}. The smoothness of $p_\delta(t)$ keeps G{δ(t)} relatively compact. Since $p_\delta(t)$ is twice as narrow as p(t), the main lobe of G{δ(t)} is about twice as wide as that of G{s(t)}. This causes a small bump in G{r(t)}. G{s(t)}+G{δ(t)} can be a good approximation for G{r(t)}. The overall impact is a slight increase in the power P{r(t)}=0.3 dB. The correction signal has a very small power P{δ(t)}=−19 dB. At the receiver, the residual error power P{Δ(n)}=−22 dB, indicating that the impact of the correction signal on receiver performance is very limited.

In some embodiments, the parameter L can be varied to achieve a desired balance between correction and distortion. Since the mechanism for generating δ(t) is unchanged, L can be chosen on the fly. For example, it may depend on the output power of the PA. If the PA is operating in a very linear region, then L can be chosen small and cause little to no change to s(t). If the PA is operating in a less linear region, then then L can be chosen larger to compact the range of magnitude of s(t).

In additional or alternative embodiments, L may be adjusted for other reasons. In some examples, L may be adjusted/determined based on different spectrum mask regulations in different frequency bands. In additional or alternative examples, L may be adjusted/determined based on whether the signal's neighbors in frequency are from the same operator. If the signal's neighbors in frequency are from the same operator looser constraints may be used on spectrum spread and allow for more aggressive signal correction. By contrast if the frequency neighbors are from a different operator, tighter constraints may be used. In additional or alternative examples, L may be adjusted/determined based on the deployment scenario. An isolated deployment, including indoors, with minimal interference to outdoor deployments may allow for looser constraints on spectrum spread.

Returning to the example illustrated by FIGS. 3 and 4A-C, If L is scaled down to L=0.6, then $\alpha_5$=0.60, P{r(t)}=0.1 dB, and P{$\Delta$(n)}=−25 dB, reflecting less aggressive correction. If L is scaled up to L=0.8, then $\alpha_5$=0.80, P{r(t)}=0.4 dB, and P{$\Delta$(n)}=−19 dB, reflecting more aggressive correction.

In some embodiments, the process used to limit signal dips can be adapted to limiting signal peaks. The parameter $\hat{L}$ can be defined as a target maximum value for |r(t)|. The correction can be thought of as reducing $\alpha_{95}$. Again using the midpoint in the interval (nT, (n+1)T) as reference, |s(nT+T/2)| is compared to $\hat{L}$, and the signal is corrected in the interval if |s(nT+T/2)|>$\hat{L}$, and the signal is left unchanged otherwise. As for limiting signal dips, a pulse $\hat{p}_\delta(t)$ is used to increase the signal values towards $\hat{L}$ in a smooth way.

The correction symbol can be expressed as $$\hat{S}_\delta(n) = \min(\hat{L} - |s(nT+T/2)|, 0)e^{j\varphi\{s(nT+T/2)\}}$$

The correction signal can be expressed as $$\hat{\delta}(t) = \sum_n \hat{S}_\delta(n) \hat{p}_\delta(t - nT)$$

The corrected signal is given by $$\hat{r}(t) = s(t) + \hat{\delta}(t)$$

The block diagram of peak correction may have a similar structure as that of dip correction in FIG. 1. Based on mainstream modulation schemes, the peaks may not be as pronounced as the dips, so the potential for peak correction may be more limited than dip correction.

Figure 7:
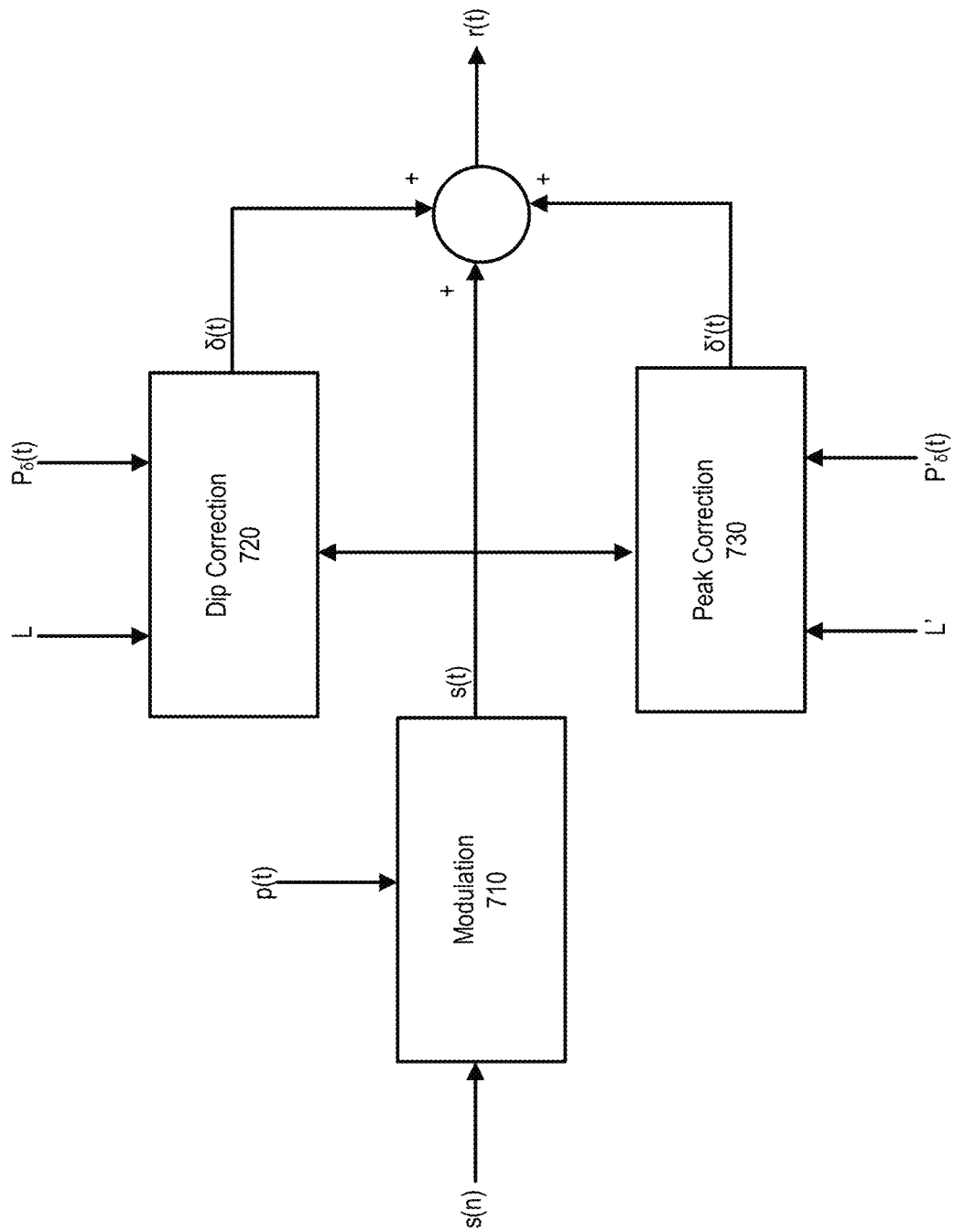
FIG. 7 is a block diagram illustrating an example of a dip and peak correction with both correction signals based on the original signal in accordance with some embodiments.

In some embodiments, the peak and dip correction can be combined. For a predetermined $\hat{L}$ and L, both $\delta(t)$ and $\hat{\delta}(t)$ can be generated based on s(t). A corrected signal, $\tilde{r}(t)$, can be determined as $\tilde{r}(t) = s(t) + \delta(t) + \hat{\delta}(t)$. FIG. 7 depicts an example of a modulator with simultaneous dip and peak correction. As shown in FIG. 7, a modulation unit 710 (or a pulse shaping unit) shapes a modulated signal s(n) using a pulse shape p(t) to generate a pulse-shaped signal s(t). A dip correction unit 720 generates a correction signal $\delta(t)$ and a peak correction unit 730 generates another correction signal $\hat{\delta}(t)$. The correction signal $\delta(t)$ and the correction signal $\hat{\delta}(t)$ are added to the modulated signal s(t) to generate a corrected signal r(t).

Figure 8:
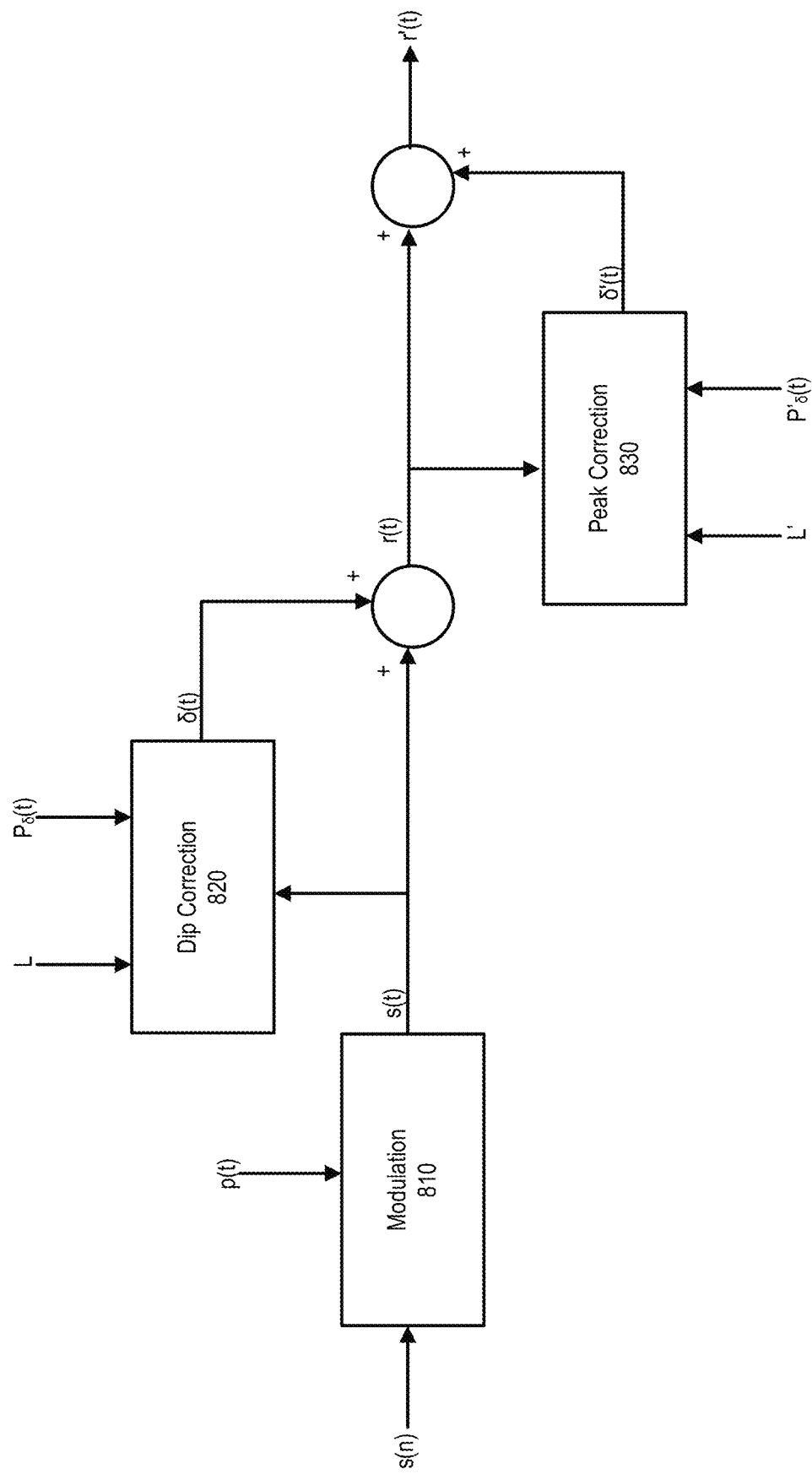
FIG. 8 is a block diagram illustrating an example of a dip and peak correction with dip correction signal based on original signal and peak correction signal based on dip corrected signal in accordance with some embodiments.

In additional or alternative embodiments, the corrections can be determined in two stages. In some examples, a modulator may first correct for the dips based on s(t), by generating $\delta(t)$ and $r(t)=s(t)+\delta(t)$. Then the modulator may correct the peaks based on r(t), by generating $\hat{\delta}(t)$ from r(t) to produce the final outcome, $\tilde{r}(t)$, as $\tilde{r}(t)=r(t)+\hat{\delta}(t)$. FIG. 8 depicts an example of a modulator with sequential dip and peak correction. As shown in FIG. 8, a modulation unit 810 (or a pulse shaping unit) shapes a modulated signal s(n) using a pulse shape p(t) to generate a pulse-shaped signal s(t). A dip correction unit 820 generates a correction signal $\delta(t)$, which is added to modulated signal s(t) to generate a corrected signal r(t). A peak correction unit 830 generates another correction signal $\hat{\delta}(t)$, which is added to r(t) to generate $\tilde{r}(t)$.

In additional or alternative examples, the order of correction can be swapped. First, the peaks can be corrected based on s(t) to generate $\hat{\delta}(t)$ and $\hat{r}(t)=s(t)+\hat{\delta}(t)$, then correct for dips based on $\hat{r}(t)$ to generate $\delta(t)$ and $\tilde{r}(t)=\hat{r}(t)+\delta(t)$.

In additional or alternative embodiments, different portions (rather than the midpoint nT+T/2) of the interval (nT,(n+1)T) can be used as the reference. In some examples, the value $\tau_n$ in (0,T) with the smallest magnitude |s(nT+$\tau_n$)| in (nT,(n+1)T), and use |s(nT+$\tau_n$)| to compare to L instead of |s(nT+T/2)|. If |s(nT+$\tau_n$)|<L, the signal is corrected over the interval. In order to ensure that the correction results in |r(nT+$\tau_n$)|=L, it can be normalize by $p_\delta(\tau_n)$. If |s(nT+$\tau_n$)|≥L, the signal can be left unchanged in the interval. The correction symbol can be written as $$S_\delta(n) = \max(L - |s(nT+\tau_n)|/p_\delta(\tau_n), 0)e^{j\varphi\{s(nT+\tau_n)\}}$$

The normalization step adds an extra constraint that $p_\delta(\tau_n) \neq 0$ over (0,T).

In additional or alternative embodiments, a similar process can be applied to the peak correction embodiments. A value $\hat{\tau}_n$ in (0, T) with the largest magnitude |s(nT+$\hat{\tau}_n$)| in (nT, (n+1)T), is compared to $\hat{L}$. The correction symbol can be written as $$\hat{S}_\delta(n) = \min(\hat{L} - |s(nT+\hat{\tau}_n)|/\hat{p}_\delta(\hat{\tau}_n), 0)e^{j\varphi\{s(nT+\hat{\tau}_n)\}}$$

The previous method relied on the knowledge that the modulation scheme avoid extreme dips, so the phase of the midpoint of the interval or the representative of the interval or provides a good direction for the correction operation. In some embodiments, an alternative method we refer to as orthogonal correction can be used for any modulation scheme including PSK and QAM modulation where the deepest dips are often near the midpoint between symbols, and that's where the phase $\varphi\{s(T/2)\}$ is unreliable. In order to provide a reliable direction for the correction, we find a line representation of the signal trajectory near the midpoint, and use the orthogonal to the line as the direction of the correction.

Let $\gamma$ and g denote the phase and magnitude of the correction symbol $S_\delta(0)$, respectively, that is $S_\delta(0)=ge^{j\gamma}$. The correction phase $\gamma$ can be determined as follows. Given a window of samples centered at T/2, the size W of the window can be odd and smaller than the oversampling rate. The phase, $\theta$, can be found from the slope of the line representing the window samples, using linear regression. The correction can be set to be orthogonal to the line. In some examples, $\gamma$ can be selected as the closer of $$\theta \pm \frac{\pi}{2}$$

to $\varphi\{s(T/2)\}$. If |s(T/2)| is indeed very small, then either $$\theta + \frac{\pi}{2}$$

or $$\theta - \frac{\pi}{2}$$

will effectively work.

The scaling g of the correction is set to produce $$r(T/2) = s(T/2) + S_\delta(0) = s(T/2) + ge^{j\gamma}$$

such that $|r(T/2)|=L$. Accordingly, $S_\delta(0)=ge^{j\gamma}$ and the local correction signal is $$\delta(t)=S_\delta(0)p_\delta(t)$$

over the interval (0, T). Again, the same procedure applies to other intervals (nT,(n+1)T), where we determine $S_\delta(n)$ based on $s(nT+T/2)$.

In some embodiments, for a window of size W of complex valued samples, the k-th sample can be represented with a real pair $(x_k, y_k)$, with $x_k$ equal to the real part and $y_k$ equal to the imaginary part. The slope a of the fitted line of the form y=ax+b can be determined as $$a = \frac{\sum_{k=1}^{W}(x_k - \bar{x})(y_k - \bar{y})}{\sum_{k=1}^{W}(x_k - \bar{x})^2}$$

$$b = \bar{y} - a\bar{x}$$

$$\bar{x} = \frac{\sum_{k=1}^{W} x_k}{W}$$

$$\bar{y} = \frac{\sum_{k=1}^{W} y_k}{W}$$

The value b may not be needed and the phase θ is given by $\theta=\tan^{-1}(\alpha)$. The phase θ will be used to determine the phase γ of the orthogonal correction signal. The candidates for γ are $$\theta \pm \frac{\pi}{2}.$$

The candidates can be compared to $\varphi\{s(T/2)\}$ and the closer value chosen as γ.

The correction signal may be scaled for g≥0 so that $|s(T/2)+ge^{j\gamma}|=L$. Let $(s_R, s_I)$ and $(u_R, u_I)$ denote the real and imaginary parts of $s(T/2)$ and $e^{j\gamma}$, respectively. (Note that $u_R^2+u_I^2=1$.) This can be reformulated as a second order equation: $g^2+Bg+C=0$, where $B=2s_R u_R+2s_I u_I$ and $C=s_R^2+s_I^2-L^2$. Accordingly, g can be determined as $$g = \frac{-B + \sqrt{B^2 - 4C}}{2}$$

and $S_\delta(0)=ge^{j\gamma}$.

If $s(T/2)$ is small, then $s_R$ and $s_I$ are small, and g≈L, so g can be approximated as L without solving the quadratic.

Figure 5:
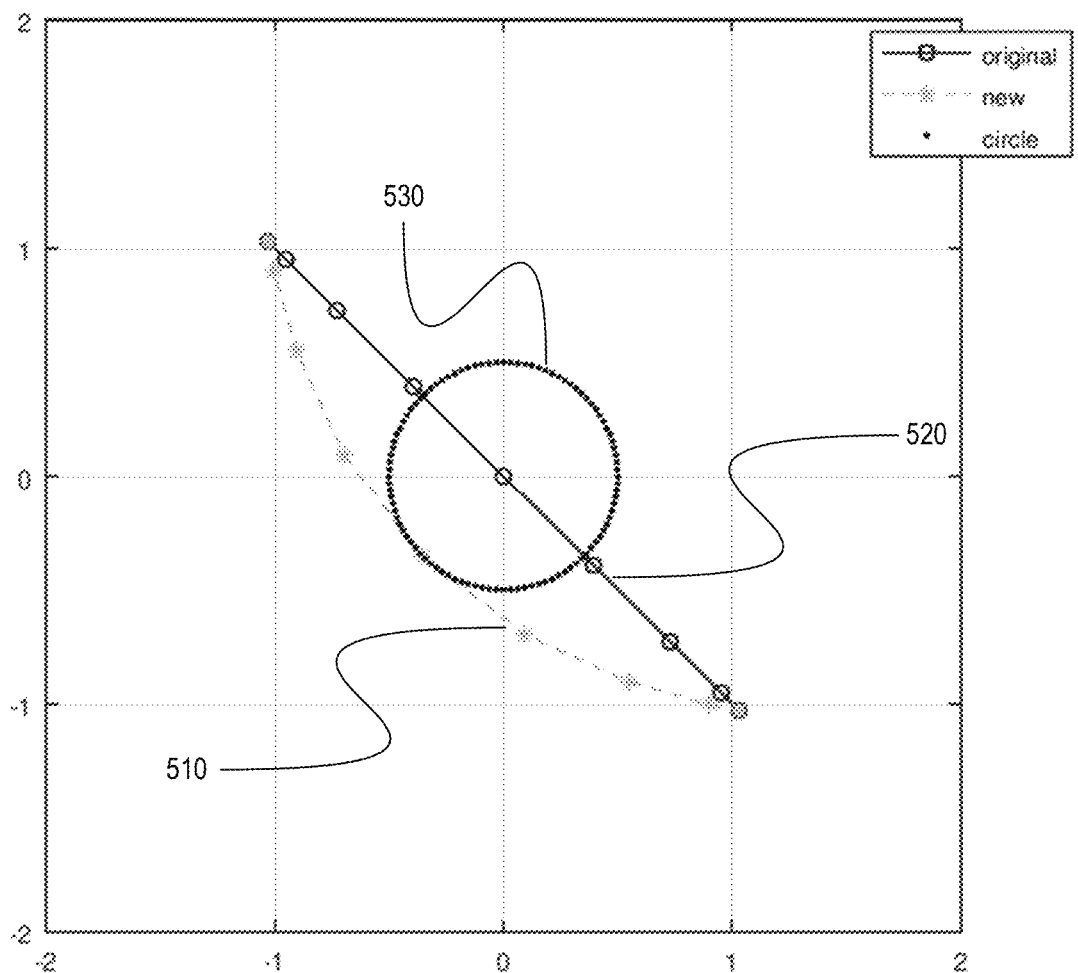
FIG. 5 is a graph illustrating an example of a QPSK trajectory in complex domain over one period in accordance with some embodiments.

FIGS. 5 and 6A-C illustrate an example using QPSK modulation. In FIG. 5, s(t) 510 is illustrated by the solid line. In this example, s(t) 510 is generated at a sampling rate of 8 samples per symbol, and the eight samples in the interval are represented by open circles. Note that s(t) 510 passes through zero at the origin in this interval.

Here, as equals 0.34 meaning that 5% of s(t) 510 is less that 0.34, and $\alpha_{95}$ equals to 1.30 meaning that 95% of s(t) is less than 1.30. The received signal r(t) 520 is represented by a dashed line with closed circles points indicating specific samples. The dotted circle 530 represents the predetermined value, L, which here is 0.5. The signal s(t) is scaled so that $P\{s(t)\}$ is 0 dB. A snapshot of the complex domain trajectories of s(t) 510 and r(t) 520 over a period is shown in FIG. 5. In this particular example, the magnitude dips very near zero. The correction is orthogonal to the local window of samples.

Figure 6A:
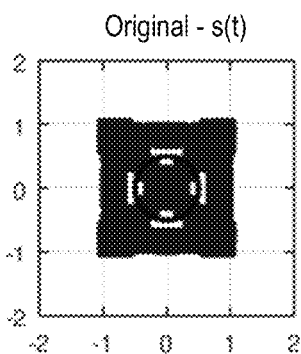
FIGS. 6A-C are graphs illustrating examples of trajectories in complex domain associated with the QPSK trajectory of FIG. 5 in accordance with some embodiments.
Figure 6B:
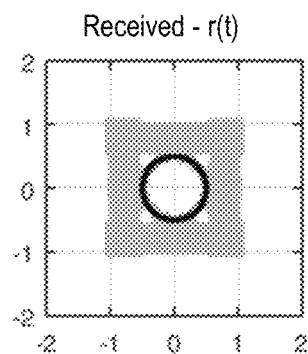
Figure 6C:
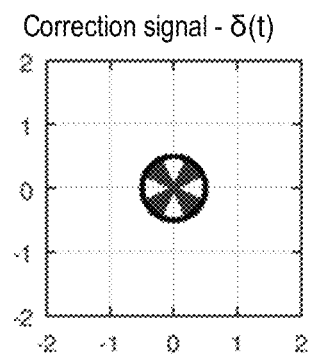

The complete complex trajectories of s(t), r(t), and δ(t) are shown in FIGS. 6A-B, respectively. Each of FIGS. 6A-B have a circle with radius of 0.5 representing L=0.5. It can be observed, that few samples below 0.5 remain for r(t). Indeed, in this example $\alpha_5$ for r(t) is 0.57 meaning only 5% of r(t) is below 0.57. On the other end, $\alpha_{95}$ is unchanged, indicating that the higher values are left alone, as desired. If $\alpha_{95}-\alpha_5$ is treated as the dynamic range, then a gain of 24% is obtained. The wider spectrum of δ(t) causes a small bump in the spectrum of r(t). At the receiver, the residual error power $P\{\Delta(n)\}$ is −20.9 dB, indicating that the impact of the correction signal on receiver performance is very limited.

Since peaks are far away from zero, there is no issue with correction at small magnitudes, so there is no need for using the orthogonal correction approach described in these embodiments to handle peaks. However, the process for handling dips described in these embodiments can be combined with the peak correction embodiments described above in a similar process as dips and peaks are combined in FIGS. 7-8 and their descriptions above.

Figure 12:
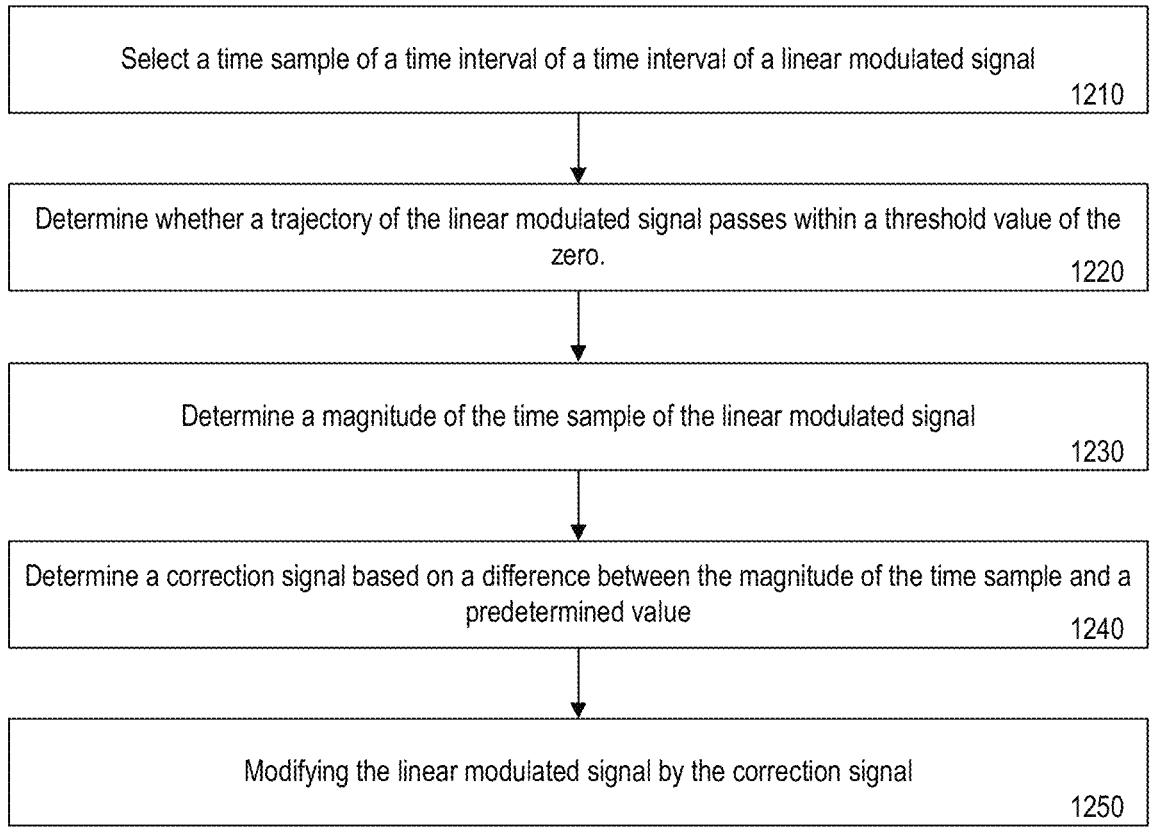
FIGS. 12-13 are flow charts illustrating examples of processes performed by a slice scheduler in accordance with some embodiments.
Figure 13:
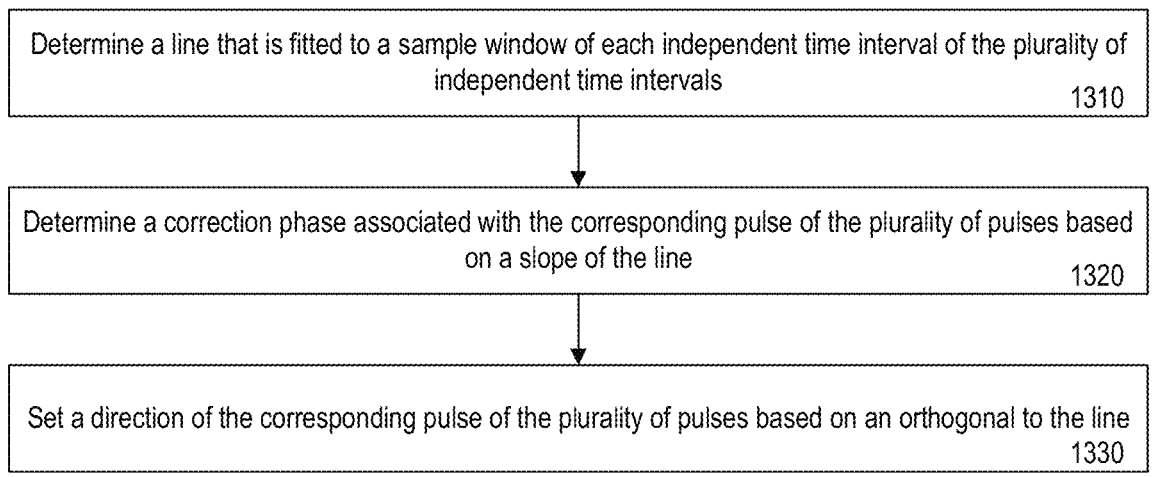

Operations of a network node will now be discussed with reference to the flow charts of FIGS. 12-13 according to some embodiments of inventive concepts. FIGS. 12-13 will be described below as being performed by RAN network node 1000 (implemented using the structure of the block diagram of FIG. 10). For example, modules may be stored in memory 1005 of FIG. 10, and these modules may provide instructions so that when the instructions of a module are executed by respective RAN node processing circuitry 1003, processing circuitry 1003 performs respective operations of the flow charts. In some embodiments, the operations of FIG. 12 can be performed by other network nodes (e.g., CN nodes or UEs) or a combination of network nodes.

FIG. 12 illustrates an example of processes performed by a network node to constrain a linear modulated signal.

At block 1210, processing circuitry 1003, selects a time sample of a time interval of a linear modulated signal. In some embodiments, the time sample is a first time sample of a plurality of time samples, each time sample of the plurality of time samples being during an independent time interval of a plurality of independent time intervals of the linear modulated signal. In additional or alternative embodiments, processing circuitry 1003 selects each time sample of the plurality of time samples to be a midpoint of an independent time interval of the plurality of independent time intervals. In additional or alternative embodiments, processing circuitry 1003 selects each time sample of the plurality of time samples to be at a time associated with a maximum magnitude during an independent time interval of the plurality of independent time intervals. In additional or alternative embodiments, processing circuitry 1003 selects each time sample of the plurality of time samples to be to be at a time associated with a minimum magnitude during an independent time interval of the plurality of independent time intervals.

At block 1220, processing circuitry 1003 determines whether a trajectory of the linear modulated signal passes within a threshold value of zero.

At block 1230, processing circuitry 1003 determines a magnitude of a time sample of a linear modulated signal. In some embodiments, the time sample is a first time sample of a plurality of time samples, each time sample of the plurality of time samples being during an independent time interval of a plurality of independent time intervals of the linear modulated signal. In additional or alternative embodiments, determining the magnitude of the time sample includes determining a magnitude for each time sample of the plurality of time samples.

At block 1240, processing circuitry 1003 determines a correction signal based on a difference between the magnitude of the time sample and a predetermined value. In some embodiments, determining the correction signal includes determining a linear modulation signal comprising a plurality of pulses, each pulse of the plurality of pulses associated with a time sample of the plurality of time samples and scaled by a value based on the difference between a magnitude of the time sample and the predetermined threshold value.

In additional or alternative embodiments, the correction signal may be determined such that it will reduce dips in the linear modulated signal. For example, determining the correction signal can include, for each time sample of the plurality of time samples, scaling a corresponding pulse by the lesser of zero and the difference between the predetermined minimum value and the absolute value of the magnitude of the time sample. In additional or alternative embodiments, the correction signal may be determined such that it will reduce peaks in the linear modulated signal. For example, determining the correction signal can include, for each time sample of the plurality of time samples, scaling a corresponding pulse by the greater of zero and the difference between a predetermined maximum value and the absolute value of the magnitude of the time sample.

In additional or alternative embodiments, in response to determining, in block 1220, that the trajectory of the linear modulated signal passes outside the threshold value of zero, determining the correction signal includes determining a correction phase associated each pulse of the plurality of pulses is the same as the phase of the linear modulated signal FIG. 13 illustrates an example of additional processes of determining a correction signal in response to determining, in block 1220, that the trajectory of the linear modulated signal passes within the threshold value of zero. At block 1310, processing circuitry 1003 determines a line that is fitted to a sample window of each independent time interval of the plurality of independent time intervals. At block 1320, processing circuitry 1003 determines a correction phase associated with the corresponding pulse of the plurality of pulses based on a slope of the line. At block 1330, processing circuitry 1003 sets a direction of the corresponding pulse of the plurality of pulses based on an orthogonal to the line.

Returning to FIG. 12, at block 1250, processing circuitry 1003 modifies the linear modulated signal by the correction signal. In some embodiments, processing circuitry transmits the modified linear modulated signal. In some embodiments, the network node is a RAN node and the communication network is a new radio, NR, network.

Various operations of FIGS. 12-13 may be optional with respect to some embodiments of network nodes and related methods.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a network node of a communication network, the method comprising:
    determining a magnitude of a time sample of a modulated signal;
    determining a correction signal based on a difference between the magnitude of the time sample and a predetermined value; and
    modifying the modulated signal by the correction signal,
    wherein the modulated signal comprises a linear modulated signal,
    wherein the time sample is a first time sample of a plurality of time samples, each time sample of the plurality of time samples being during an independent time interval of a plurality of independent time intervals of the linear modulated signal,
    wherein determining the magnitude of the time sample comprises determining a magnitude for each time sample of the plurality of time samples, and
    wherein determining the correction signal comprises determining a linear modulation signal comprising a plurality of pulses, each pulse of the plurality of pulses associated with a time sample of the plurality of time samples and scaled by a value based on the difference between a magnitude of the time sample and the predetermined value.

2. The method of claim 1, wherein determining the correction signal further comprises, for each time sample of the plurality of time samples, scaling a corresponding pulse by a lesser of zero and the difference between the predetermined value and the absolute value of the magnitude of the time sample.

3. The method of claim 1, wherein determining the correction signal further comprises, for each time sample of the plurality of time samples, scaling a corresponding pulse by the greater of zero and the difference between a predetermined maximum value and the absolute value of the magnitude of the time sample.

4. The method of claim 1, further comprising, selecting each time sample of the plurality of time samples to be a midpoint of an independent time interval of the plurality of independent time intervals.

5. The method of claim 1, further comprising, selecting each time sample of the plurality of time samples to be at a time associated with a maximum magnitude during an independent time interval of the plurality of independent time intervals.

6. The method of claim 1, further comprising, selecting each time sample of the plurality of time samples to be to be at a time associated with a minimum magnitude during an independent time interval of the plurality of independent time intervals.

7. The method of claim 1, further comprising determining that a trajectory of the linear modulated signal passes within a threshold value of zero,
    wherein, responsive to determining that the trajectory of the linear modulated signal passes within the threshold value of zero, determining the correction signal comprises:
        determining a line that is fitted to a sample window of each independent time interval of the plurality of independent time intervals;

determining a correction phase associated with a corresponding pulse of the plurality of pulses based on a slope of the line; and setting a direction of the corresponding pulse of the plurality of pulses based on an orthogonal to the line.

8. The method of claim 1, further comprising determining that a trajectory of the linear modulated signal passes outside a threshold value of zero, wherein, responsive to determining that the trajectory of the linear modulated signal passes outside the threshold value of zero, determining the correction signal comprises determining a correction phase associated each pulse of the plurality of pulses is the same as the phase of the linear modulated signal.

9. A network node operating in a communication network, the network node comprising:

processing circuitry; and memory coupled to the processing circuitry and having instructions stored therein that are executable by the processing circuitry to cause the network node to perform operations, the operations comprising:

determine a magnitude of a time sample of a modulated signal;

determine a correction signal based on a difference between the magnitude of the time sample and a predetermined value; and modify the modulated signal by the correction signal, wherein the modulated signal comprises a linear modulated signal, wherein the time sample is a first time sample of a plurality of time samples, each time sample of the plurality of time samples being during an independent time interval of a plurality of independent time intervals of the linear modulated signal, wherein determine the magnitude of the time sample comprises determine a magnitude for each time sample of the plurality of time samples, wherein determine the correction signal comprises determine a linear modulation signal comprising a plurality of pulses, each pulse of the plurality of pulses associated with a time sample of the plurality of time samples and scaled by a value based on the difference between a magnitude of the time sample and the predetermined value.

10. The network node of claim 9, wherein determine the correction signal further comprises, for each time sample of the plurality of time samples, scaling a corresponding pulse by a lesser of zero and the difference between the predetermined value and the absolute value of the magnitude of the time sample.

11. The network node of claim 9, wherein determine the correction signal further comprises, for each time sample of the plurality of time samples, scaling a corresponding pulse by the greater of zero and the difference between a predetermined maximum value and the absolute value of the magnitude of the time sample.

12. The network node of claim 9, further comprising select each time sample of the plurality of time samples to be a midpoint of an independent time interval of the plurality of independent time intervals.

13. The network node of claim 9, further comprising select each time sample of the plurality of time samples to be at a time associated with a maximum magnitude during an independent time interval of the plurality of independent time intervals.

14. The network node of claim 9, further comprising select each time sample of the plurality of time samples to be at a time associated with a minimum magnitude during an independent time interval of the plurality of independent time intervals.

15. The network node of claim 9, further comprising determine that a trajectory of the linear modulated signal passes within a threshold value of zero, wherein, responsive to determine that the trajectory of the linear modulated signal passes within the threshold value of zero, determine the correction signal comprises:

determine a line that is fitted to a sample window of each independent time interval of the plurality of independent time intervals;

determine a correction phase associated with a corresponding pulse of the plurality of pulses based on a slope of the line; and set a direction of the corresponding pulse of the plurality of pulses based on an orthogonal to the line.

16. The network node of claim 9, further comprising determine that a trajectory of the linear modulated signal passes outside a threshold value of zero, wherein, responsive to determine that the trajectory of the linear modulated signal passes outside the threshold value of zero, determine the correction signal comprises determine a correction phase associated each pulse of the plurality of pulses is the same as the phase of the linear modulated signal.

17. A computer program product comprising a non-transitory storage medium including program code to be executed by processing circuitry of a network node operating in a communication network, whereby execution of the program code causes the network node to perform operations, the operations comprising:

determine a magnitude of a time sample of a modulated signal;

determine a correction signal based on a difference between the magnitude of the time sample and a predetermined value; and modify the modulated signal by the correction signal, wherein the modulated signal comprises a linear modulated signal, wherein the time sample is a first time sample of a plurality of time samples, each time sample of the plurality of time samples being during an independent time interval of a plurality of independent time intervals of the linear modulated signal, wherein determine the magnitude of the time sample comprises determine a magnitude for each time sample of the plurality of time samples, wherein determine the correction signal comprises determine a linear modulation signal comprising a plurality of pulses, each pulse of the plurality of pulses associated with a time sample of the plurality of time samples and scaled by a value based on the difference between a magnitude of the time sample and the predetermined value.

* * * * *